United States Patent [19]
Masuda et al.

[11] Patent Number: 5,384,843
[45] Date of Patent: Jan. 24, 1995

[54] HANDS-FREE TELEPHONE SET

[75] Inventors: Hiroyuki Masuda; Kazutoshi Hosokawa; Kensaku Fujii; Juro Ohga, all of Kawasaki, Japan

[73] Assignee: Fujitsu Limited, Kawasaki, Japan

[21] Appl. No.: 122,787

[22] Filed: Sep. 15, 1993

[30] Foreign Application Priority Data

Sep. 18, 1992 [JP] Japan .................. 4-250275

[51] Int. Cl.⁶ .......................... H04M 9/08
[52] U.S. Cl. ................. 379/391; 379/390; 379/389; 379/388; 381/113; 381/92
[58] Field of Search ........... 379/391, 390, 389, 388, 379/420, 402, 406, 407, 409, 410, 411; 381/113, 92

[56] References Cited

U.S. PATENT DOCUMENTS

| | | | |
|---|---|---|---|
| 4,414,433 | 11/1983 | Horie et al. | 381/113 |
| 4,703,506 | 10/1987 | Sakamoto et al. | 381/92 |
| 5,027,393 | 6/1991 | Yamamura et al. | 379/388 |
| 5,075,687 | 12/1991 | Chen et al. | 379/388 |

*Primary Examiner*—James L. Dwyer
*Assistant Examiner*—Jacques M. Saint-Surin

[57] ABSTRACT

An acoustic echo canceler and a side-tone echo canceler provided in a hands-free telephone suppress an acoustic echo and a side-tone echo respectively with few error by providing automatic gain controllers and/or limiters in the hands-free telephone so that the acoustic echo canceler and the side-tone echo canceler operate in linear, and a directional characteristic of a microphone used in the hands-free telephone for reducing the acoustic echo is controlled by a microphone direction controller so that the microphone operates as an omnidirectional microphone when a level of a received signal of the hands-free telephone is less than a designated level and as a bidirectional microphone when the level exceeds the designated level, further gains of an output of the microphone increases in a low frequency range.

14 Claims, 13 Drawing Sheets

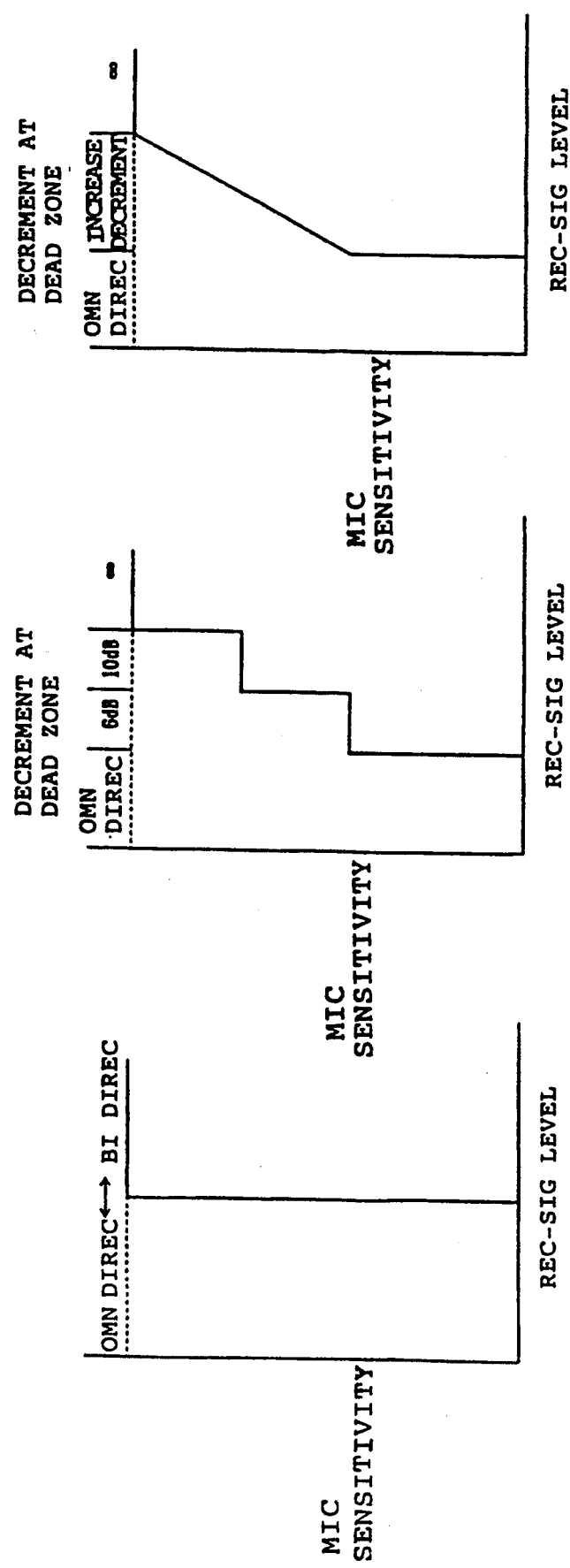

HANDS-FREE TELEPHONE SET

BACKGROUND OF THE INVENTION

1. Field of the Invention

The present invention relates to a hands-free telephone set providing a microphone and a loudspeaker for making telephone communication in hands-free. In particular, the present invention relates to a hands-free telephone set including an acoustic echo suppression system and a side-tone echo suppression system.

2. Description of the Related Art

Lately, a hands-free telephone set, which will be simply called a "hands-free telephone" hereinafter, comes into use because of convenience. By virtue of the hands-free telephone, telephone communication can be performed in hands-free, using a microphone, a loudspeaker and single chip digital signal processing integrated circuits associated with them.

In a telephone set, generally, an echo phenomenon occurs, and in an ordinary hand-set telephone set, an echo phenomenon occurs due to a side-tone echo produced by impedance mismatching at a well known two-wire/four-wire converter in the telephone set. However, in the hands-free telephone, not only the side-tone echo but also an acoustic echo due to sound coupling between the loudspeaker and the microphone is produced. Therefore, in the hands-free telephone, there are two echo suppression systems, an acoustic echo suppression system including the loudspeaker and the microphone and a side-tone echo suppression system including the two-wire/four-wire converter.

Since the microphone and the loudspeaker are apart from the mouth and ears of telephone talker, which will be simply called "talker" hereinafter, respectively, the hands-free telephone is susceptible to influences from surrounding noise and reverberation, in comparison with the ordinary hand-set telephone.

Further, since the microphone and the loudspeaker are arranged closely on the hands-free telephone, the acoustic echo caused by acoustic coupling between the microphone and the loudspeaker occurs easily. Still further, since the microphone is apart from the mouth of talker, voice sound coming from talker into the microphone becomes small, which causes the microphone to produce a small output signal. As a result, gains must be increased for amplifying the small signal, which causes to produce easily well known howling in the hands-free telephone.

Great efforts have been exerted for solving the above problems. FIG. 1 shows a block diagram of a most modern hands-free telephone 1' of the prior art, developed in consideration of the above problems.

In FIG. 1, a microphone (MIC) 10 receives voice of talker and produces an analog signal which will be called a "transmitting analog signal" hereinafter. The transmitting analog signal is sent to an analog digital converter (A/D) 21 by which the transmitting analog signal is converted to a digital signal which will be called a "transmitting digital signal" hereinafter. The transmitting digital signal is sent to an acoustic echo canceler (AEC) 60, which is a key device of the acoustic echo suppression system, by which an acoustic echo caused by acoustic coupling between MIC 10 and a loudspeaker 20 is suppressed. The transmitting digital signal having passed through AEC 60 is sent to a voice-switched variable attenuator (V-SW ATT) 90 whose function will be explained later. The transmitting digital signal having passed through V-SW ATT 90 is sent to a digital analog converter (D/A) 31 and partly to an sidetone echo canceler (SEC) 70 which is a key device of the side-tone echo suppression system and will be also explained later. In D/A 31, the transmitting digital signal is converted back to an analog signal called a transmitting analog output signal hereinafter. Then, the transmitting analog output signal is sent to a hybrid circuit (H) 50 which is a well known two-wire/four-wire converter used in a conventional telephone set. That is, the four-wire transmitting analog output signal is converted to a two-wire transmitting analog signal at H 50. The two-wire transmitting analog signal is sent to a local switch, not depicted in FIG. 1, through a two-wire telephone line 51.

When the hands-free telephone 1' receives a two-wire received analog signal from the local switch through the two-wire telephone line 51, the two-wire received analog signal is converted to a four-wire received analog signal at H 50. The four-wire received analog signal is converted to a received digital signal at an analog digital converter (A/D) 22. The received digital signal output from A/D 22 is sent to SEC 70 by which a side-tone echo caused by the leakage signal produced due to the impedance mismatching at H 50 is suppressed in cooperation with the transmitting digital signal sent to SEC 70 partly through V-SW ATT 90. The received digital signal having passed through SEC 70 is sent to V-SW ATT 90. The received digital signal having passed through V-SW ATT 90 is sent to a received signal amplifier (REC-SIG AMP) 81 at which the received digital signal is amplified to a manually controlled level, producing an amplified received digital signal. The amplified received digital signal is sent to a digital analog converter (D/A) 32 where the amplified received digital signal is converted to a received analog signal. The received analog signal output from D/A 32 is sent to a loudspeaker (SPK) 40 so that received telephone voice is loudly spoken from SPK 40. Hereupon, a part of the received analog signal output from REC-SIG AMP 81 is fed to AEC 60 for suppressing the acoustic echo.

In the above, the echo suppression performed by AEC 60 (SEC 70) is accomplished by synthesizing an echo replica and subtracting the echo replica from the output signal of MIC 10 (H 50). Wherein, the echo replica is a signal simulating the echo, produced in accordance with an estimation process performed through MIC 10 and SPK 20 in case of AEC 60 and through H 50 in case of SEC 70. By virtue of applying AEC 60 (SEC 70) to the hands-free telephone 1', the echo suppression can be performed well. However, it takes a processing time to perform the synthesization and the subtraction of the echo replica, and during the processing time, the hands-free telephone 1' becomes unstable in operation, so that the hands-free telephone 1' happens to fall into oscillation such as howling. The V-SW ATT 90 is an automatic attenuator mainly for preventing such oscillation from occurring in the hands-free telephone 1'. The V-SW ATT 90 compares amplitude of the transmitting digital signal and the received digital signal applied to V-SW ATT 90 for determining which digital signal is smaller and reduces amplitude of the smaller digital signal so as to maintain the hands-free telephone 1' in a stable state during the processing time.

A paper on the hands-free telephone 1', especially about AEC 60, SEC 70 and V-SW ATT 90, has been read in Abstracts of Meeting on Acoustic Engineering, held by Acoustic Society of Japan in March, 1990, titled "A study on loudspeaker telephone using small echo cancellets", by Hiroyuki Masuda, Kensaku Fujii and Juro Ohga who are inventors of the present invention. The same subject as the above is presented at 119th Meeting held by Acoustic Society of America, titled "Hands-free telephone using compact echo cancelers and voice-switched attenuators", by Juro Ohga, Hiroyuki Masuda, Kensaku Fujii and Yoshiro Sasaki, and the abstract of the presentation is published in J. Acoustic Soc. Am. Suppl. 1, Vol. 87, Spring 1990. Further, a paper theoretically explaining the acoustic echo canceler has been read in "Special Section on Acoustic System Modeling and Signal Processing", of IEICE TRANS. FUNDAMENTALS. VOL. E75-A, NO. 11 NOVEMBER 1992, with a title "A Fast Adaptive Algorithm Suitable for Acoustic Echo Cancellet", by Kensaku Fujii and Juro Ohga.

The AEC 60 is the key device of the acoustic echo suppression system. However, MIC 10 is another important device of the acoustic echo suppression system. Because, loosening the acoustic coupling between MIC 10 and SPK 40 is very important for suppressing the acoustic echo. However, since SPK 40 and MIC 10 are arranged closely, SPK 40 and MIC 10 easily form the acoustic echo coupling. Therefore, in order to prevent the acoustic echo coupling from occurring between SPK 40 and MIC 10, a bidirectional microphone system shown in FIG. 2(a) is applied to MIC 10.

In FIG. 2(a), the bidirectional microphone system of MIC 10 consists of a pair of omnidirectional microphones (OMN MICs) 10A and 10B, a pair of microphone amplifiers (MIC AMPs) 10a and 10b connected with omnidirectional microphones 10A and 10b respectively and an operational amplifier (OPE AMP) 10C connected with MIC AMPs 10a and 10b at a minus terminal and a plus terminal of OPE AMP 10C respectively. The bidirectional microphone system is for making MIC 10 receive sound directly from SPK 40 substantially as little as possible. Since the outputs from OMN MICs 10A and 10B are sent to OPE AMP 10C, when the outputs from OMN MICs 10A and 10B are equal to each other, no output signal (transmitting analog signal) is produced from OPE AMP 10C theoretically. Therefore, when OMN MICs 10A and 10B are arranged on the hands-free telephone 1' so that distances directly from SPK 40 to OMN MICs 10A and 10B are equal to each other, the output from OPE AMP 10C can be reduced. In this case, if talker speaks toward MIC 10 in a direction perpendicular to a line connecting OMN MICs 10A and 10B, the transmitting analog signal due to voice of talker can be produced from OPE AMP 10C in maximum. Because, the difference between talker's voice arrived at OMN MICs 10A and 10B becomes maximum, resulting in producing a maximum output from OPE AMP 10C. A bidirectional characteristic of MIC 10 (the bidirectional microphone system) is shown in FIG. 2(b). In FIG. 2(b), the bidirectional characteristic is represented by angular co-ordinates. The OMN MICs 10A and 10B are positioned on a line including 0° and 180° axes and origin "0" of the angular coordinates is placed at a middle point between OMN MICs 10A and 10B. The bidirectional characteristic shows in FIG. 2(b) that the output of MIC 10 becomes maximum at angle 0° and 180° and minimum at angle 90° and 270°. It can be realized from the bidirectional characteristic that SPK 40 should be placed in a plane including 90°–270° axis and perpendicular to 0°–180° axis for minimizing the acoustic echo and talker should speak toward point "0" along 0°–180° axis for obtaining the maximum output from MIC 10. In FIG. 2(b), a zone including 90° and 270° axes will be called a dead zone hereinafter.

Problems in the Prior Art

However, the hands-free telephone 1' of the prior art has a problem that levels of the transmitting analog signal sent to A/D 21 and the four-wire received analog signal arrived at A/D 22 fluctuate respectively as much as 20 dB in difference. Since talker speaks to MIC 10 without handling the hands-free telephone 1', talker speaks extremely near to or far from MIC 10 occasionally, so that the transmitting analog signal sent to A/D 21 fluctuates as much as 20 dB in level, and since the telephone loss changes every time when line is changed at the local switch, the four-wire received analog signal arrived at A/D 22 also fluctuates as much as 20 dB in level. As a result, when the fluctuation occurs in such large amount, the fluctuation exceeds dynamic ranges of elements such as A/D 21, A/D 22, D/A 31, D/A 32 and REC-SIG AMP 81, causing saturation of the elements, which results in production of non-linear elements in the hands-free telephone 1'.

Since AEC 60 (SEC 70) is required to synthesize the echo replica in the estimation process, if there is a non-linear element in a circuit linked to AEC 60 (SEC 70), it becomes hard to carry out the estimation process for producing the echo replica. Wherein, the circuit linked to AEC 60 is a circuit including MIC 10, A/D 21, AEC 60, D/A 32 and SPK 20, making linkage for the acoustic echo suppression, and the circuit linked to SEC 70 is a circuit including H 50, A/D 22, SEC 70 and D/A 31, making linkage for the side-tone echo suppression.

As a result, the hands-free telephone 1' becomes unstable and falls into oscillation, making the hands-free telephone 1' impossible to perform the telephone communication.

Meanwhile, there is another problem in regard to the acoustic echo suppression system. The bidirectional microphone system of MIC 10 has a great merit to the acoustic echo suppression system, decreasing the sound directly coming into MIC 10 from SPK 40 and the reverberation in room. However, when talker speaks in the dead zone of MIC 10, the level of the transmitting analog signal-output from MIC 10 decreases extremely. Therefore, when persons gather for holding a voice meeting, encircling the hands-free telephone 1', the voice from the persons positioned in the dead zone becomes small, so that it becomes hard to hold the voice meeting.

SUMMARY OF THE INVENTION

Therefore, a first object of the present invention is to improve the acoustic echo suppression system in the hands-free telephone so that the system operates in stable though a level difference of the transmitting signal in a linked circuit to the system is large as much as causing saturation of elements in the linked circuit.

Another second object of the present invention is to improve the side-tone echo suppression system in the hands-free telephone so that the system operates in stable though a level difference of the received signal in a linked circuit to the system is large as much as causing saturation of elements in the linked circuit.

Still another third object of the present invention is to increase operation reliability of the echo suppression in the hands-free telephone.

Yet another fourth object of the present invention is to improve the bidirectional microphone in the acoustic echo suppression system of the hands-free telephone so that the bidirectional characteristic of the microphone is changed in response to the circumstances of the hands-free telephone.

Further another fifth object of the present invention is to expand usefulness of the hands-free telephone.

The above first and third objects are achieved by providing transmitting signal level control means consisting of an automatic gain controller and a limiter to a circuit not linked to the acoustic echo suppression system so that no non-linear element appears in the linked circuit though the transmitting signal in the linked circuit has a large difference in level. In the above, the limiter is provided for limiting the level of the transmitting signal, until the automatic gain controller becomes a steady state of operation.

The above second and third objects are achieved by providing received signal level control means consisting of an automatic gain controller and a limiter to a circuit not linked to the side-tone echo suppression system so that no non-linear element appears in the linked circuit though the received signal in the linked circuit has a large difference in level. In the above, the limiter is provided for limiting the level of the received signal, until the automatic controller becomes a steady state of operation.

By virtue of providing the automatic gain controller and the limiter to the acoustic echo suppression system and the side-tone echo suppression system respectively, the acoustic echo and the side-tone echo can be suppressed in stable though the level of the signal treated in the hands-free telephone increases so high as a level having been impossible to perform the echo suppression in the prior art.

The above fourth and fifth objects are achieved by providing microphone direction control means consisting of a switching circuit to the bidirectional microphone system in the hands-free telephone, for controlling the bidirectional microphone system in the hands-free telephone. By virtue of controlling the bidirectional microphone system, the microphone of the hands-free telephone is used as a bidirectional microphone when a level of the received signal is higher than a designated level and as a omnidirectional microphone when the received signal is lower than the designated level,and further the bidirectional characteristic of the microphone can be changed so as to be matched to circumstances of the hands-free telephone. Since the bidirectional microphone unit consists of two omnidirectional microphones and an operational amplifier connected to the two omnidirectional microphones through a microphone amplifier respectively, when one of two inputs to the operational amplifier is disconnected by the switching circuit, the microphone of the hands-free telephone becomes an omnidirectional microphone, and when amplification of one of the microphone amplifiers is controlled by the switching circuit, the bidirectional characteristic of the microphone can be changed.

Further, the fourth object of the present invention is achieved by providing a low-pass filter in the bidirectional microphone system for raising a frequency response in a low frequency range. Generally, the output of the bidirectional microphone system has a frequency characteristic that a frequency response in a low frequency range decreases. Providing the low-pass filter thus, the transmitting signal from the hands-free telephone is improved so that the telephone sound from the hands-free telephone becomes clearer. Consequently, it becomes less necessary to raise amplitude of the transmitting and received signals in the hands-free telephone, which is effective in suppressing the acoustic echo.

Providing the microphone direction control means to the bidirectional microphone system, the hands-free telephone can be used flexibly and usefully. For instance, when the circumstances of the hands-free telephone is calm, the microphone can be used as the omnidirectional microphone for making the service area of the hands-free telephone broad, and when the circumstances become noisy, the microphone is changed to be used as the bidirectional microphone for preventing the occurrence of the acoustic echo. Further, when the hands-free telephone is used to, for example, the voice meeting, the microphone can be used as the omnidirectional microphone or the bidirectional microphone in corresponding to the circumstances around the voice meeting.

BRIEF DESCRIPTION OF THE DRAWINGS

FIG. 12(a) is a graph representing acoustic sensitivity of the bidirectional microphone controlled by a switch in the microphone direction controller shown in FIG.

Figure 10:
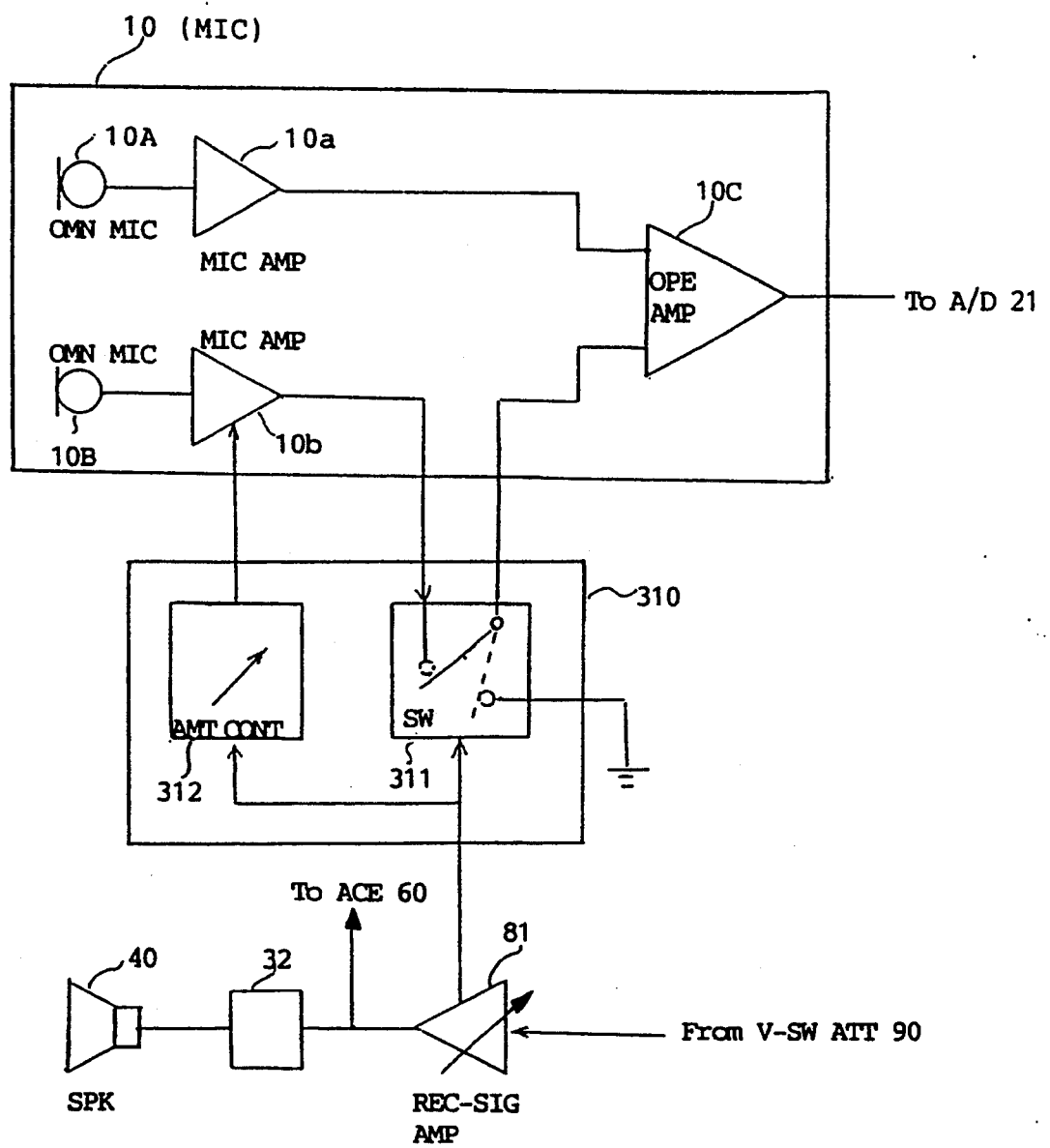
FIG. 10 is a block diagram of the bidirectional microphone system of the hands-free telephone of the present invention and of the microphone direction controller provided to the bidirectional microphone system, for illustrating the fifth embodiment of the present invention.
Figures 13A, 13B:
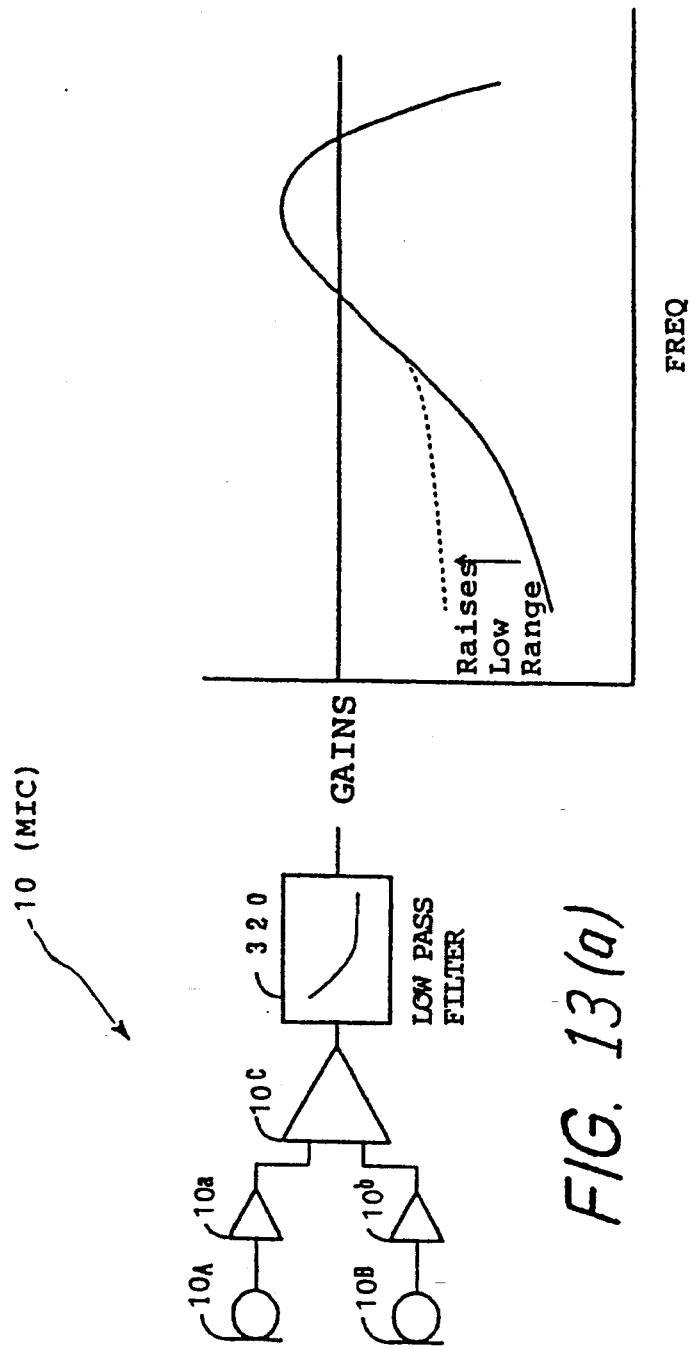

10, to levels of a received digital signal in the hands-free telephone;

FIG. 12(b) is a graph representing acoustic sensitivity of the bidirectional microphone controlled by an amplitude controller in the microphone direction controller shown in FIG. 10, to levels of a received digital signal in the hands-free telephone;

FIG. 12(c) is another graph representing acoustic sensitivity of the bidirectional microphone controlled by the amplitude controller, to the levels of the received digital signal;

FIG. 13(a) is a block diagram of a low-pass filter provided to the microphone in the hands-free telephone 1 of the seventh embodiment of the present invention; and FIG. 13(b) is a graph representing a frequency characteristic of a transmitting analog signal passed through the low-pass filter shown in FIG. 13(a).

DESCRIPTION OF THE PREFERRED EMBODIMENTS

Figure 3:
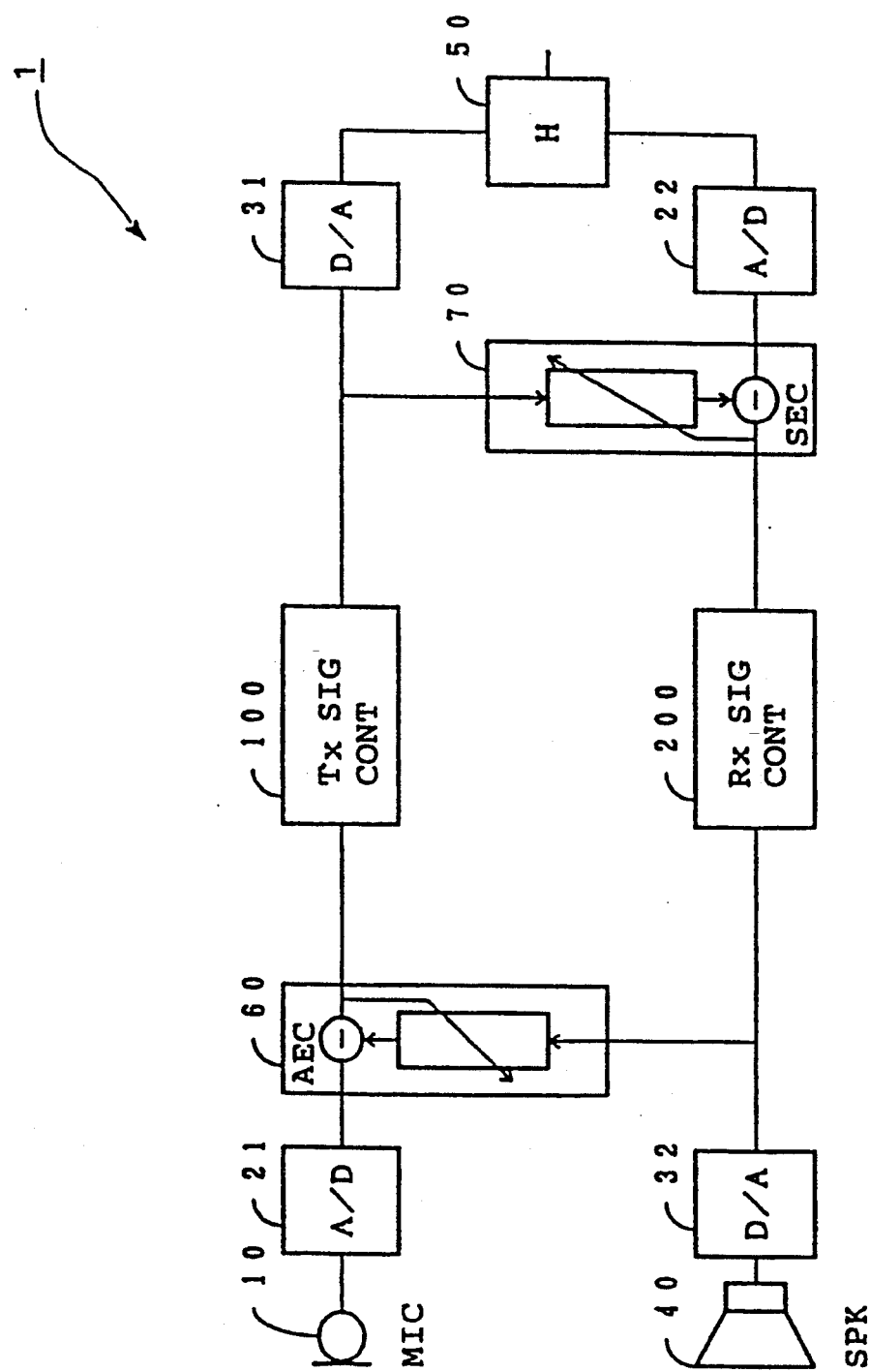
FIG. 3 is a block diagram of a hands-free telephone, for illustrating a principle of the present invention.

FIG. 3 is a block diagram for showing the principle of a hands-free telephone 1 of the present invention. In FIG. 3, the same reference numeral as in FIG. 1 designates the same part as in FIG. 1. In FIG. 3, transmitting signal level control means (Tx-SIG CONT) 100 and received signal level control means (Rx-SIG CONT) 200 are provided to circuits not linked to the AEC 60 and SEC 70 respectively. The transmitting signal level control means 100 is for controlling the level of the transmitting digital signal produced from A/D 21, and the received signal level control means 200 is for controlling the level of the received digital signal produced from A/D 22, so as not to produce saturation of elements in the linked circuits to AEC 60 and SEC 70 respectively. As explained before, the linked circuit to AEC 60 is a circuit including MIC 10, A/D 21, AEC 60, D/A 32 and SPK 40 in FIG. 3, and the linked circuit to SEC 70 is a circuit including H 50, A/D 22, SEC 70 and D/A 31 in FIG. 3. These transmitting signal level control means 100 and received signal level control means 200 control the levels of the transmitting signal and the received signal so that no non-linear element appears in the linked circuits of AEC 60 and SEC 70 respectively.

Figures 2A, 2B:
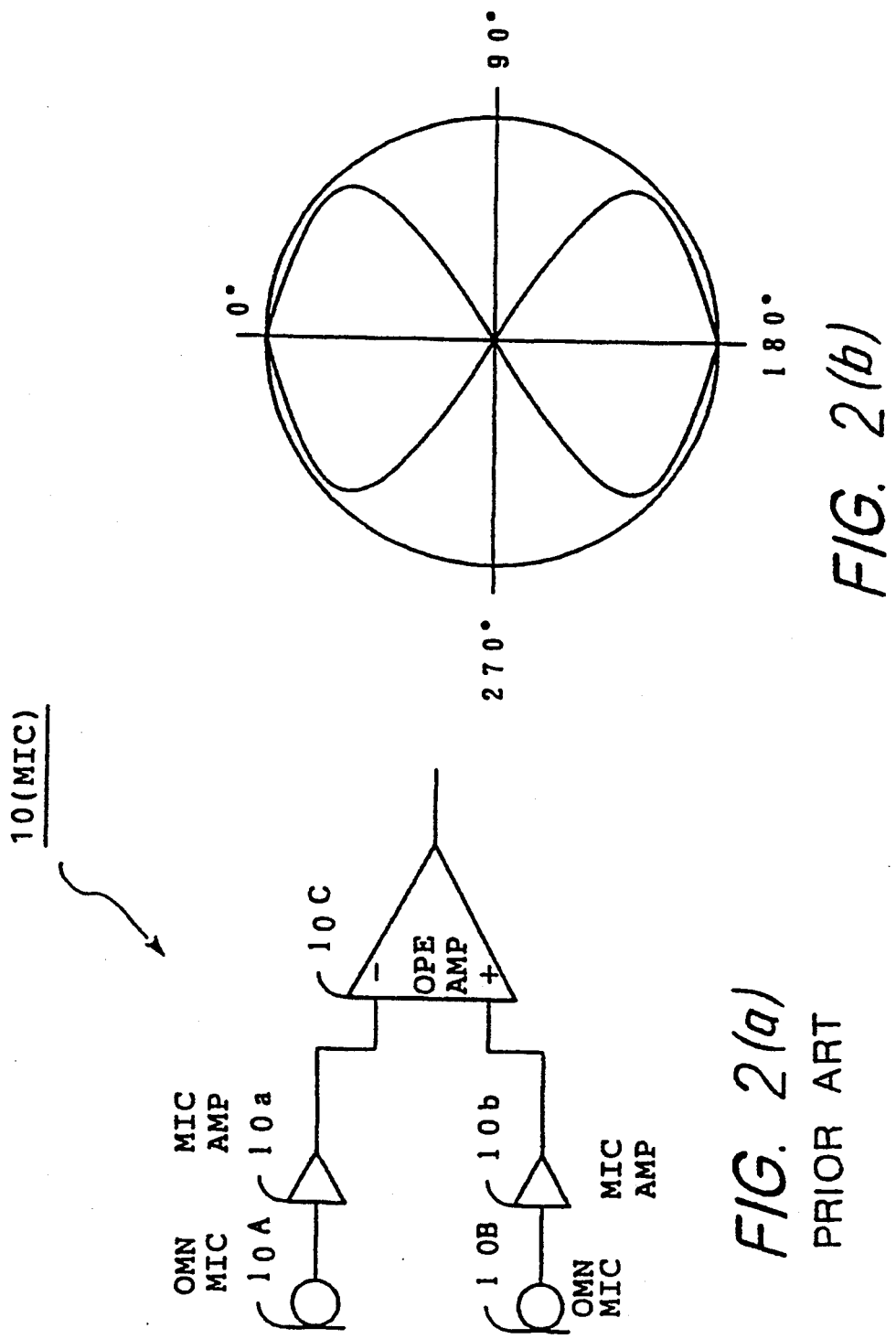
FIG. 2(a) is a block diagram of a biodirectional microphone system of the microphone in the hands-free telephone of the prior art.
FIG. 2(b) is a bidirectional characteristic of the bidirectional microphone system shown in FIG. 2(a)
Figure 4:
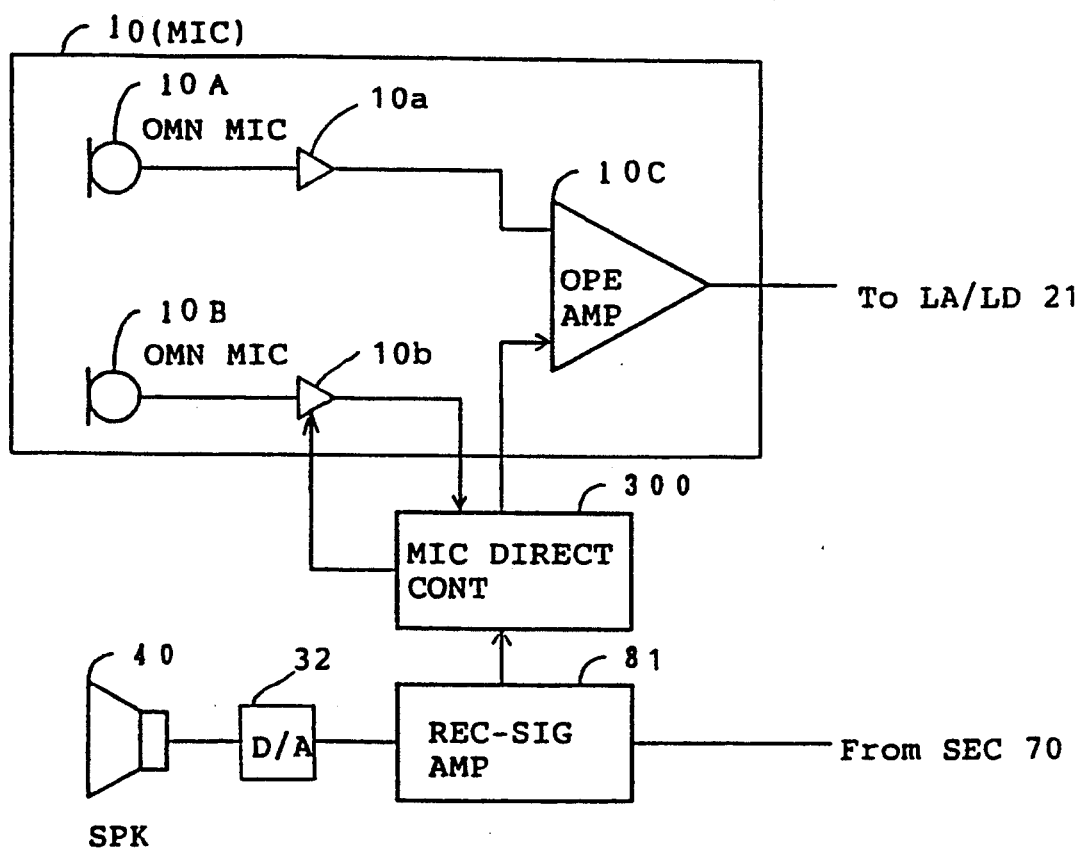
FIG. 4 is a block diagram of a microphone direction control means, for illustrating a principle of the microphone direction control means.

FIG. 4 is a block diagram for showing the principle of microphone direction control means (MIC DIRECT CONT) 300 provided to the bidirectional microphone system (MIC 10) in the hands-free telephone 1. In FIG. 4 the same reference numeral as in FIG. 2 designates the same part as in FIG. 2. In FIG. 4, microphone direction control means 300 has three operation modes, bidirection mode, omnidirection mode and variable bidirection mode. In the bidirection mode, means 300 performs no control to the bidirectional microphone system, so that MIC 10 operates as the bidirectional microphone as explained in the prior art in reference to FIG. 2. In the omnidirection mode, means 300 controls the bidirectional microphone system so that MIC 10 operates as a omniderectional microphone. In the variable bidirection mode, means 300 controls the bidirectional microphone system so that MIC 10 has a variable bidirectional characteristic.

In the omnidirection mode, the control is performed by disconnecting one of two inputs of OPE AMP 10C, and in the variable bidirection mode, the control is performed by changing amplitude of one of MIC AMPs 10a and 10b.

The selection of the modes is performed by either way, automatically or manually. However, usually, the selection of the bidirection mode and the omnidirection mode is performed automatically. For instance, when the level of the received signal is less than a level designated at REC-SIG AMP 81, the ominidirection mode is selected and when the level of the received signal exceeds the designated level the bidirection mode is selected.

Figure 5:
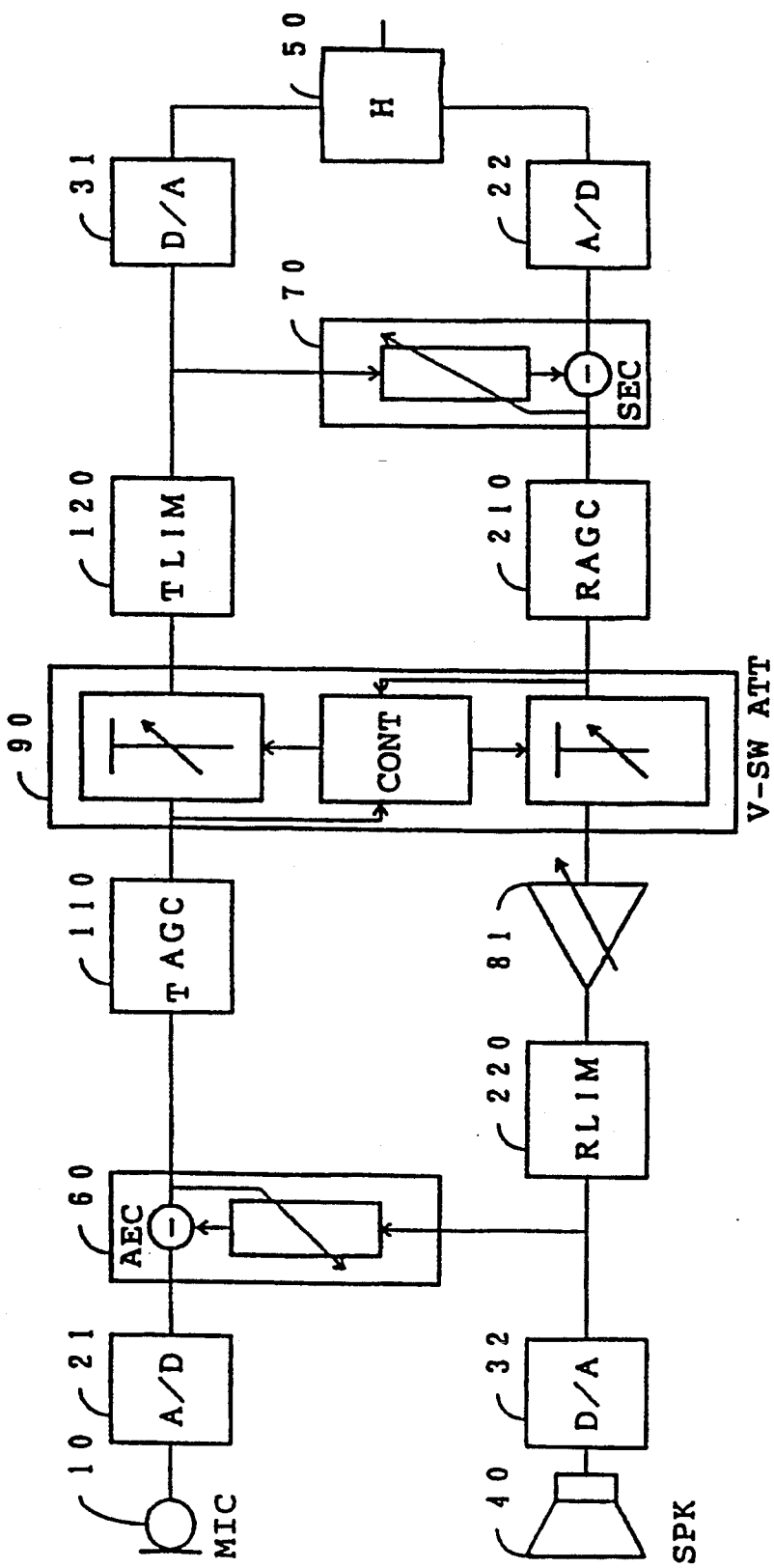
FIG. 5 is a block diagram of the hands-free telephone, for illustrating the first embodiment of the present invention.

FIG. 5 shows a block diagram for the hands-free telephone 1 of the first embodiment of the present invention. In FIG. 5, the same reference numeral as in FIG. 1 designates the same part as in FIG. 1. In the hands-free telephone 1 shown in FIG. 5, Tx-SIG CONT 100 shown in FIG. 3 is composed of a transmitting signal automatic gain controller (TAGC) 110 and a transmitting signal limiter (TLIM) 120, and Rx-SIG CONT 200 is composed of a received signal automatic gain controller (RAGC) 210 and a received signal limiter (RLIM) 220. In the above composition of Tx-SIG CONT 100 and Rx-SIG CONT 200, TAGC 110 and RAGC 220 automatically control amplitude of the transmitting digital signal and the received digital signal in corresponding to their levels respectively, so that no non-linear element appears in circuits linked to AEC 60 and SEC 70 respectively. However, since TAGC 110 and RAGC 220 require a little time (several millisecond) to build up to their normal states, TLIM 120 and RLIM 220 are provided for suppressing a large level of the transmitting digital signal and the received digital signal during the rising up time.

Hereupon, in the hands-free telephone 1, arranging positions of AGCs and LIMs are important. Because, if AGCs and LIMs were arranged in the circuits linked to AEC 60 and SEC 70, AGCs and LIMs would be changed to non-linear elements because of their saturation, spoiling the estimation process of AEC 60 and SEC 70.

Figure 1:
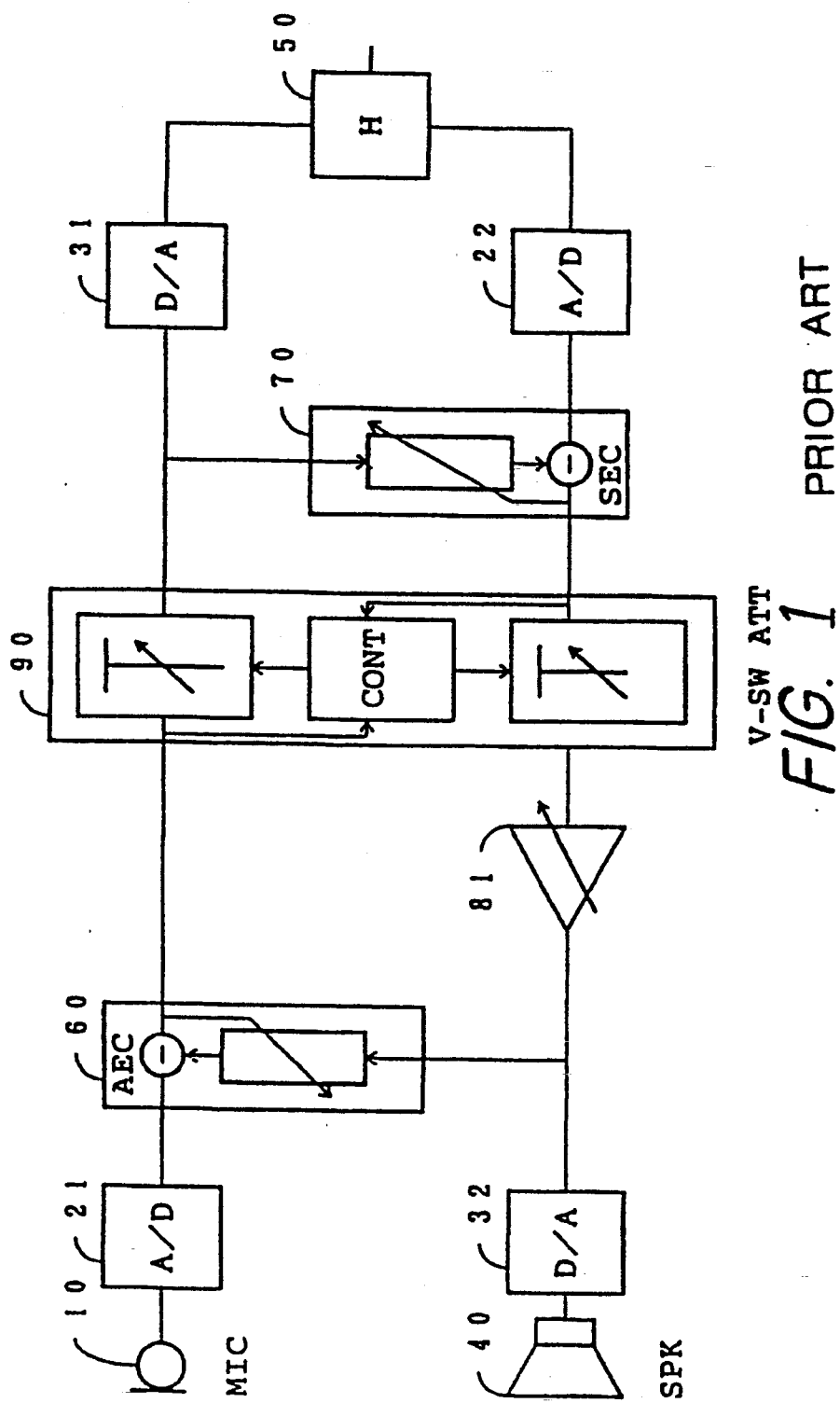
FIG. 1 is a block diagram of a hands-free telephone of the prior art.
Figure 6:
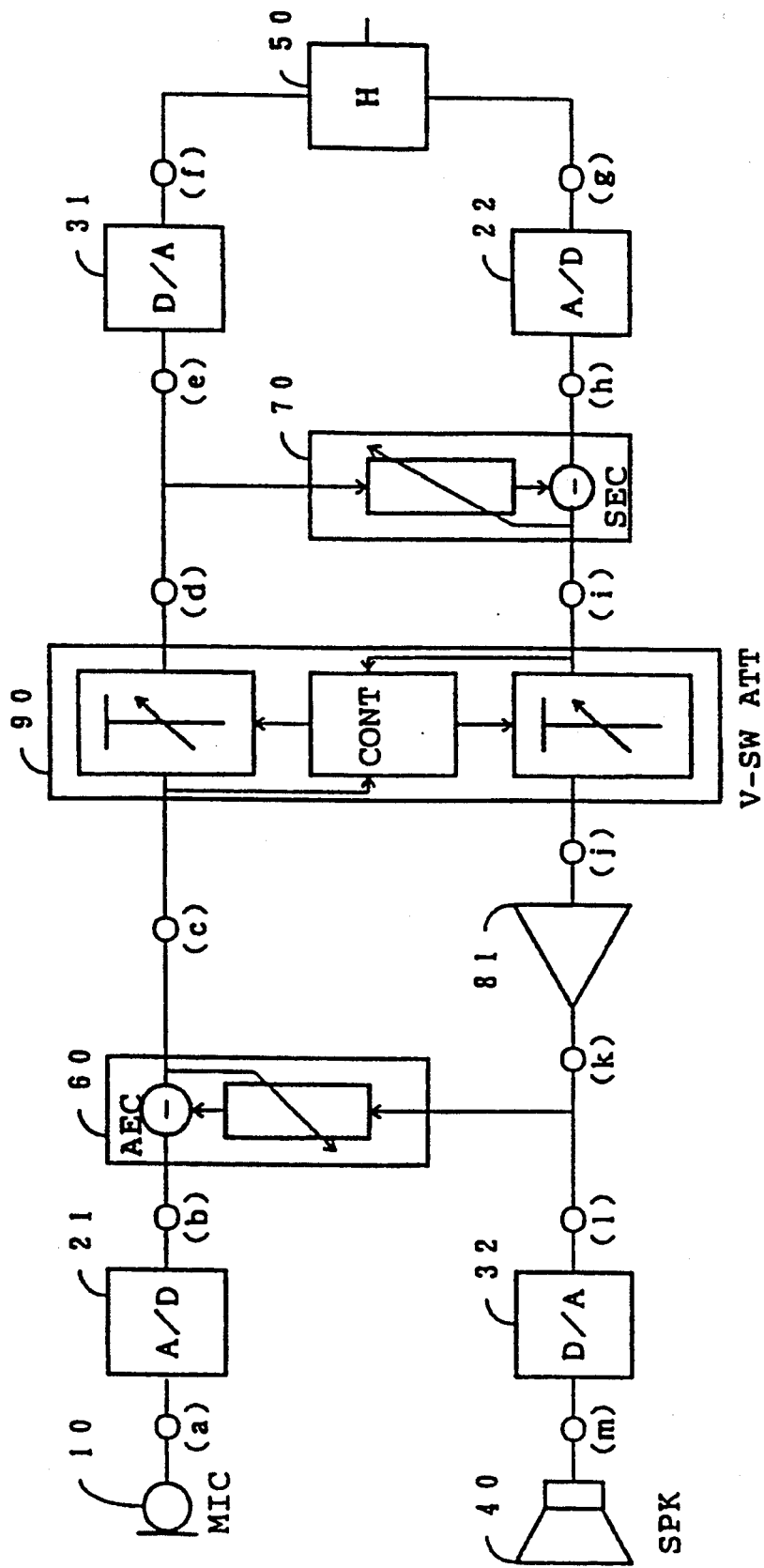
FIG. 6 is a block diagram of the hands-free telephone of the present invention, for illustrating arranging positions of automatic gain controls and/or limiters of transmitting signal level control means and received signal level control means in the hands-free telephone.

FIG. 6 shows the same block diagram as in FIG. 1, however, in which nodes (a)~(m) are illustrated to explain positions for arranging AGC or LIM. Since the linked circuit of AEC 60 includes nodes (a), (b), (l) and (m) and the linked circuit of SEC 70 includes nodes (e), (f), (g) and (h), AGC or LIM cannot be positioned at these nodes. Therefore, AGC or LIM can be positioned at nodes (c), (d), (i), (j) and (k) in which TAGC or TLIM can be positioned at nodes (c) and (d) and RAGC or RLIM can be poisoned at nodes (i), (j) and (k).

Figure 7:
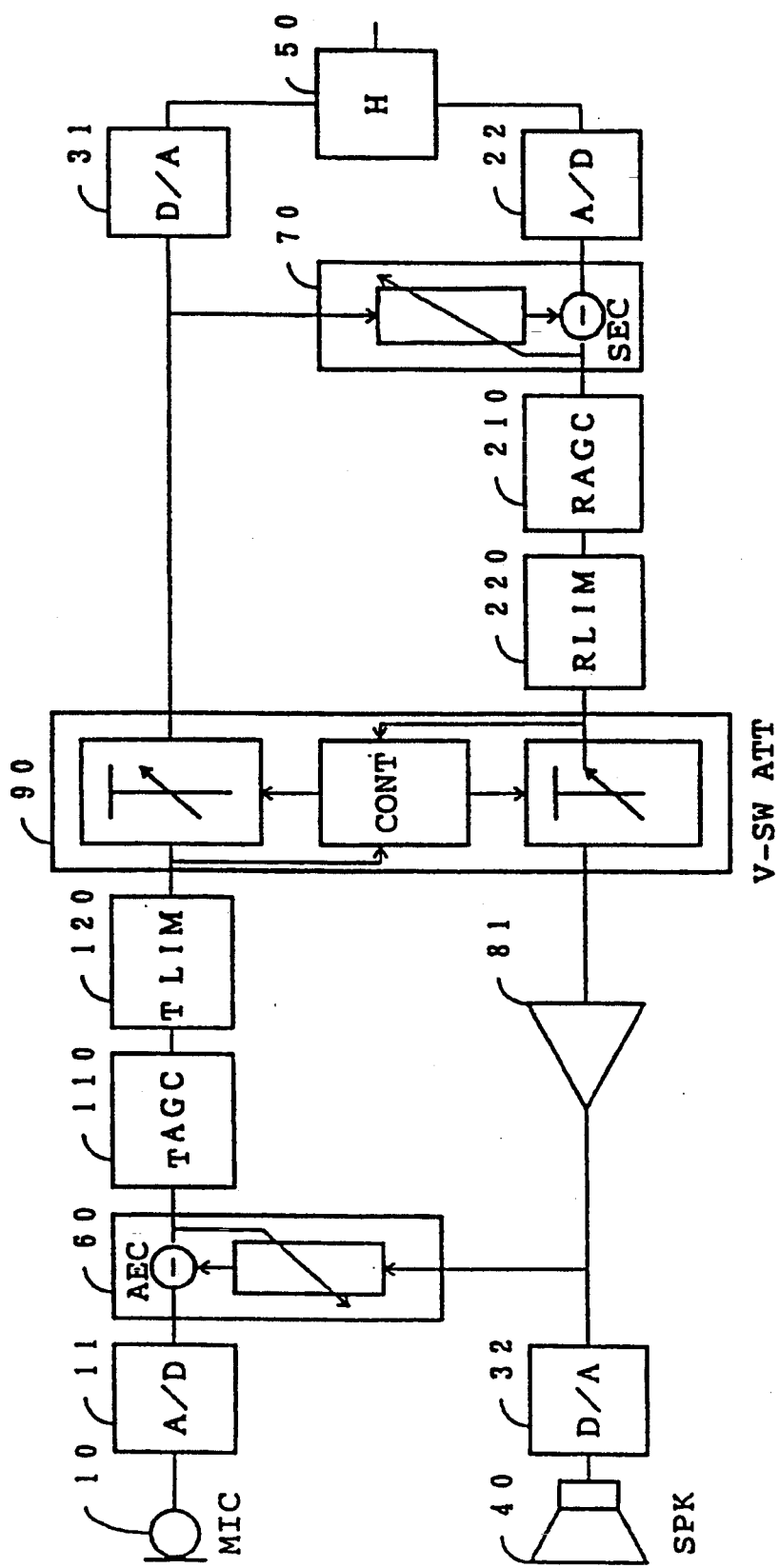
FIG. 7 is a block diagram of the hands-free telephone of the present invention, for illustrating the second embodiment of the present invention.

FIG. 7 shows a block diagram for the hands-free telephone 1 of the second embodiment of the present invention. In FIG. 7, the same reference as in FIG. 5 designates the same part as in FIG. 5. In the second embodiment in FIG. 7, TAGC 110 and TLIM 120 are arranged at node (c) and RAGC 210 and RLIM 220 are arranged at node (i) in FIG. 6. As shown in FIG. 7, TAGC 110 and TLIM 120, and RAGC 210 and RLIM 220 can be gathered respectively at the same node.

Figure 8:
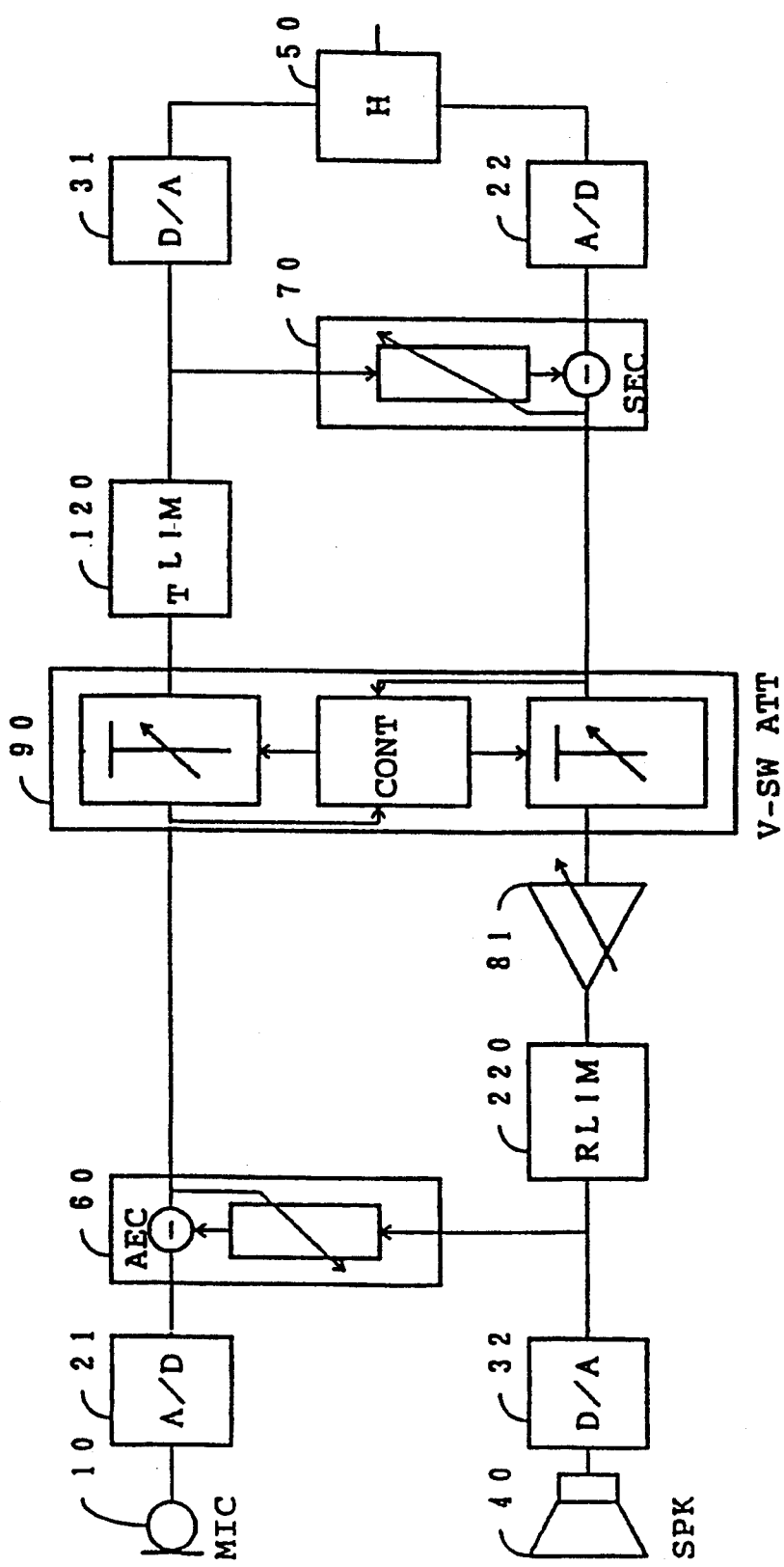
FIG. 8 is a block diagram of the hands-free telephone of the present invention, for illustrating the third embodiment of the present invention.

FIG. 8 shows a block diagram for the hands-free telephone 1 of the third embodiment of the present invention. In FIG. 8, the same reference as in FIG. 5 designates the same part as in FIG. 5. In the third embodiment in FIG. 8, only TLIM 120 is used as Tx-SIG CONT 100 and arranged at node (d) in FIG. 6 and only RLIM 220 is used as Rx-SIG CONT 200 and arranged at node (k) in FIG. 6. In FIG. 8, TAGC 110 and RAGC 210 can be arranged in the handsfree telephone 1 instead of TLIM 120 and RLIM 220 respectively.

Figure 9:
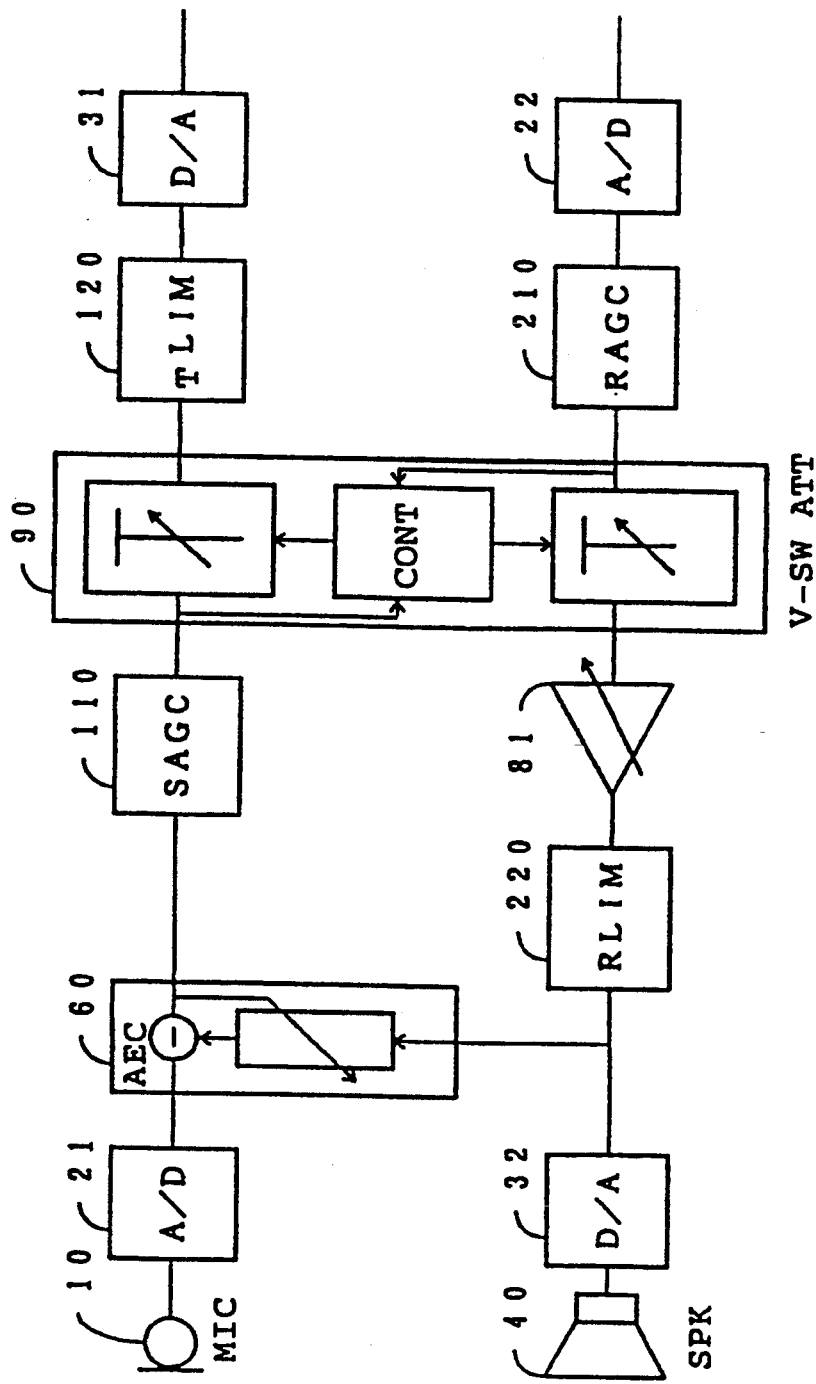
FIG. 9 is a block diagram of the hands-free telephone of the present invention, for illustrating the fourth embodiment of the present invention.

FIG. 9 shows a block diagram for the hands-free telephone 1 of the fourth embodiment of the present invention. In FIG. 9, the same reference as in FIG. 5 designates the same part as in FIG. 5. The fourth embodiment in FIG. 9 shows a case where the hands-free telephone 1 is connected to four-wire telephone line as seen in ISDN. In this case, since H 50 shown in FIG. 5 is not necessary to be provided in the hands-free telephone 1, there is no leakage signal due to the impedance mismatching at H 50. Therefore, SEC 70 shown in FIG. 5 is also not necessary to be provided in the hands-free telephone 1. As a result, in the fourth embodiment in FIG. 9, TAGC 110, TLIM 120, RAGC 210 and RLIM 220 are arranged at nodes (c), (d or e), (h or i) and (k) in FIG. 6, respectively.

FIG. 10 shows a block diagram for a microphone direction controller (MIC DIR CONTROLLER) 310 included in the hands-free telephone 1, of the fifth embodiment of the present invention. In FIG. 10, the same reference numeral as in FIGS. 2(a) and 5 designates the same part as in FIGS. 2(a) and 5.

In FIG. 10, RES-SIG AMP 81 has a setter for setting a designated level and a sensor for sensing whether a level of the received digital signal sent from V-SW ATT 90 exceeds the designated level and producing a switching signal to MIC DIR CONTROLLER 310 when the level exceeds the designated level. (The setter and sensor are not depicted in FIG. 10.) A switch (SW) 311 in MIC DIR CONTROLLER 310 is for switching one of input circuits of OPE AMP 10C to earth or to one of MIC AMPs 10a and 10b. In FIG. 10, the input circuit of OPE AMP 10C is a circuit connected to "+" terminal of OPE AMP 10C and the input circuit connects MIC AMP 10b through SW 310.

When the level of the received digital signal sent from V-SW ATT 90 is lower than the designated level, no switching signal is produced from REC-SIG AMP 81. Then, SW 311 does not operate, so that the input circuit of OPE AMP 10C is grounded. As a result, MIC 10 operates as the omnidirectional microphone.

When the level of the received digital signal exceeds the designated level, the switching signal is produced from REC-SIG AMP 81 and sent to SW 311. Then, SW 311 operates so that OPE AMP 10C is connected with MIC AMP 10b as shown in FIG. 10. As a result, MIC 10 operates as the bidirectinal microphone.

The results of the operation of SW 311 is graphed in FIG. 12(a). In FIG. 12(a), the vertical axis represents acoustic sensitivity of MIC 10 (MIC SENSITIVITY) and the horizontal axis represents the level of the received digital signal (REC-SIG LEVEL). In FIG. 12(a), when REC-SIG LEVEL increases and exceeds the designated level, the directional characteristic of MIC 10 is changed from omnidirectinal characteristic to bidirectional characteristic.

In FIG. 10, an amplitude controller (AMP CONT) 312 is provided in MIC DIR CONTROLLER 310. The amplitude of MIC AMP 10b is changed by MIC DIR CONTROLLER 310 when the switching signal is sent from REC-SIG AMP 81. Changing the amplitude of MIC AMP 10b, two input signals of OPE AMP 10C are unbalanced, so that the bidirectional characteristic of MIC 10 is changed in response to the change of the amplitude of MIC AMP 10b.

The results of the operation of SW 311 is graphed in FIGS. 12(b) and 12(c). The vertical axis and the horizontal axis are same as those in FIG. 12(a) respectively. When the amplitude is changed in steps, MIC SENSI-TIVITY is changed in steps as shown in FIG. 12(b). As the amplitude of MIC AMP 10b is increased thus, the decrement of the bidirectional characteristic at the dead zone is changed in steps like 0 dB (omnidirection), 6 dB, 10 dB and infinity. When the amplitude is changed gradually, MIC SENSITIVITY is changed also gradually as shown in FIG. 12(c). As the amplitude of MIC AMP lob is increased thus, the decrement of the bidirectional characteristic at the dead zone is changed gradually.

Not depicted in FIG. 10, SW 311 and AMP CONT 312 can be used together or independently, switching of SW 311 can be made manually, and switching of AMP CONT 312 can be made manually or automatically.

Figure 11:
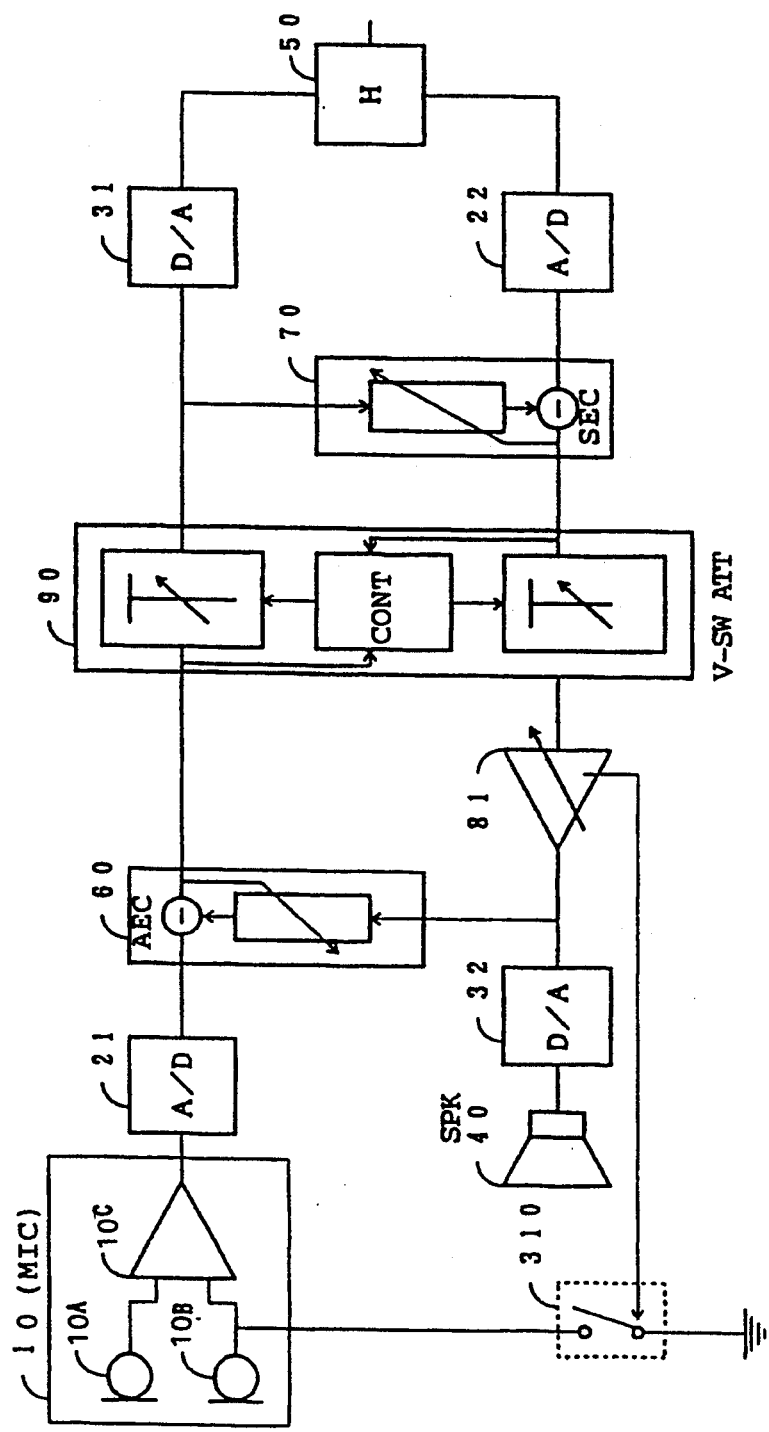
FIG. 11 is a block diagram of the hands-free telephone of the present invention, for illustrating the sixth embodiment of the present invention.

FIG. 11 shows a block diagram for the hands-free telephone 1 of the sixth embodiment of the present invention. In FIG. 11, the same reference numeral as in FIG. 5 designates the same part as in FIG. 5. FIG. 11 shows a case where MIC DIR CONTROLLER 310 is included in the prior art hands-free telephone 1' shown in FIG. 1. However, as a matter of course, MIC DIR CONTROLLER 310 can be included in the hands-free telephone 1 shown in FIG. 5, 7, 8 or 9. In FIG. 11, MIC DIR CONTROLLER 310 is depicted simply so that MIC AMPs 10a and 10b are omitted to be depicted.

FIG. 13(a) shows a partial block diagram concerned to a low-pass filter provided in the hands-free telephone 1 of the seventh embodiment of the present invention. In FIG. 13(a), the same reference numeral as in FIG. 10 designates the same part as din FIG. 10. Generally, the output of the bidirectinal microphone has a frequency characteristic that a frequency response decreases in a low frequency range. Therefore, in FIG. 13(a), a low-pass filter (LOW-PASS FILTER) 320 is provided at the output of OPE AMP 10C. Providing LOW-PASS FILTER 320 thus, the frequency response increases in the low frequency range as shown in FIG. 13(b). A dotted curve depicted in FIG. 13(a) shows that the frequency response is raised up in the low frequency range.

What is claimed is:

1. A hands-free telephone set including a bidirectional microphone (10), a transmitting signal analog digital converter (21), an acoustic echo canceler (60), a transmitting signal digital analog converter (31), a received signal analog digital converter (22), a received signal amplifier (81), a received signal digital analog converter (32) and a loudspeaker (40), said hands-free telephone set comprising:

transmitting signal level automatic control means (100) for controlling a level of a transmitting digital signal produced from the transmitting signal analog digital converter (21) and passed through the acoustic echo canceler (60) so that the acoustic echo canceler (60) linearly suppresses acoustic echo produced due to an acoustic coupling between the loudspeaker (40) and the bidirectional microphone (10).

2. A hands-free telephone set according to claim 1 further comprising microphone direction control means (300) provided to the bidirectional microphone (10), for controlling a microphone directional characteristic of the bidirectional microphone (10), said microphone direction control means (300) comprising:

switch means (311) for disconnecting one of two input circuits of an operational amplifier (10C) of the bidirectional microphone (10) and making the disconnected input circuit ground, so that one of two outputs from two omnidirectional microphones (10A and 10B) of the bidirectional microphone (10) is sent to the operational amplifier (10C) when a level of a received digital signal received at the received signal amplifier (81) exceeds a designated level, and for connecting the two input circuits so that the two outputs from the omnidirectional microphones (10A and 10B) are sent to the operational amplifier (10C) when the level of the received digital signal is less than the designated level.

3. A hands-free telephone set according to claim 2, wherein said microphone direction control means (300) further comprises:

amplitude control means (312) for controlling amplitude of one of two microphone amplifiers (10a and 10b) of the bidirectional microphone (10), placed between the two omnidirectional microphones (10A and 10B) and the operational amplifier (10C) respectively, so that the amplitude increases when the level of the received digital signal exceeds the designated level and increases; and selection means for selecting either said switch means (311) or said amplitude control means (312) to use.

4. A hands-free telephone set including a bidirectional microphone (10), a transmitting signal analog digital converter (21), an acoustic echo canceler (60), a transmitting signal digital analog converter (31), a hybrid circuit (50), a received signal analog digital converter (22), a side-tone echo canceler (70), a received signal amplifier (81), a received signal digital analog converter (32) and a loudspeaker (40), said hands-free telephone set comprising:

transmitting signal level automatic control means (100) for controlling a level of a transmitting digital signal produced from the transmitting signal analog digital converter (21) and passed through the acoustic echo canceler (60) so that the acoustic echo canceler (60) linearly suppresses acoustic echo produced due to an acoustic coupling between the loudspeaker (40) and the bidirectional microphone (10); and received signal level automatic control means (200) for controlling a level of a received digital signal produced from the received signal analog digital converter (22) and passed through the side-tone echo canceler (70) so that the side-tone echo canceler (70) linearly suppresses side-tone echo produced due to impedance mismatching occurring at the hybrid circuit (50).

5. A hands-free telephone set according to claim 4 further comprising microphone direction control means (300) provided to the bidirectional microphone (10), for controlling a microphone directional characteristic of the bidirectional microphone (10), said microphone direction control means (300) comprising:

switch means (311) for disconnecting one of two input circuits of an operational amplifier (10C) of the bidirectional microphone (10) and making the disconnected input circuit ground, so that one of two outputs from two omnidirectional microphones (10A and 10B) of the bidirectional microphone (10) is sent to the operational amplifier (10C) when a level of a received digital signal received at the received signal amplifier (81) exceeds a designated level, and for connecting the two input circuits so that the two outputs from the omnidirectional microphones (10A and 10B) are sent to the operational amplifier (10C) when the level of the received digital signal is less than the designated level.

6. A hands-free telephone set according to claim 5, wherein said microphone direction control means (300) further comprises:

amplitude control means (312) for controlling amplitude of one of two microphone amplifiers (10a and 10b) of the bidirectional microphone (10), placed between the two omnidirectional microphones (10A and 10B) and the operational amplifier (10C) respectively, so that the amplitude increases when the level of the received digital signal exceeds the designated level and increases; and selection means for selecting either said switch means (311) or said amplitude control means (312) to use.

7. A hands-free telephone set according to claim 3, said microphone direction control means (300) further comprises frequency filter means (320) for increasing gains of a transmitting analog signal produced from the operational amplifier (10C) in a low frequency range.

8. A hands-free telephone set according to claim 6, said microphone direction control means (300) further comprises frequency filter means (320) for increasing gains of a transmitting analog signal produced from the operational amplifier (10C) in a low frequency range.

9. A hands-free telephone set according to claim 3, wherein said transmitting signal level automatic control means (100) comprises a transmitting signal automatic gain controller (110).

10. A hands-free telephone set according to claim 3, wherein said transmitting signal level automatic control means (100) comprises a transmitting signal limiter (120).

11. A hands-free telephone set according to claim 9, wherein said transmitting signal level automatic control means (100) further comprising a transmitting signal limiter (120).

12. A hands-free telephone set according to claim 6, wherein said transmitting signal level automatic control means (100) comprises a transmitting signal automatic gain controller (110), and received signal level automatic control means (200) comprises a received signal automatic gain controller (210).

13. A hands-free telephone set according to claim 6, wherein said transmitting signal level automatic control means (100) comprises a transmitting signal limiter (120), and received signal level automatic control means (200) comprises a received signal limiter (220).

14. A hands-free telephone set according to claim 12, wherein said transmitting signal level automatic control means (100) further comprises a transmitting signal limiter (120) and received signal level automatic control means (200) further comprises a received signal limiter (220).

* * * * *